United States Patent [19]
Podlesny et al.

[11] Patent Number: 4,926,519
[45] Date of Patent: May 22, 1990

[54] TROWEL

[75] Inventors: Daniel B. Podlesny, New Brunswick; Ralph Lopez, Cliffwood Beach, both of N.J.

[73] Assignee: Red Devil, Inc., Union, N.J.

[21] Appl. No.: 335,846

[22] Filed: Apr. 10, 1989

[51] Int. Cl.$^5$ .............................................. B05C 17/10
[52] U.S. Cl. ..................................... 15/235.4; 15/245
[58] Field of Search ................ 15/235.4, 235.5, 235.6, 15/143 R, 145; 264/23, 249; 425/87, 458

[56] References Cited

U.S. PATENT DOCUMENTS

| | | | |
|---|---|---|---|
| 3,419,297 | 12/1968 | Diepenhorst et al. | 264/249 X |
| 3,458,618 | 7/1969 | Burns et al. | 264/249 |
| 4,316,302 | 2/1982 | Clark | 15/235.4 |
| 4,817,231 | 4/1989 | Ocwieja | 15/235.4 |

FOREIGN PATENT DOCUMENTS 570586 2/1933 Fed. Rep. of Germany .... 15/143 R

*Primary Examiner*—Chris K. Moore
*Attorney, Agent, or Firm*—Lane & Aitken

[57] ABSTRACT

A plastic trowel wherein strength is achieved through use of a blade with a smooth lower side and with handle-retaining members integral with an upper side. Strengthening ribs are disposed on the upper side of the blade. A ribbed handle includes end portions having broad flat areas for contacting the upper face of the blade. Openings in the end portions engage bosses defining the handle-retaining members. The bosses are upset to fasten the handle to the blade. Fastening may be supplemented by cementing or ultrasonic welding the abutting surfaces of the end portions and the blade.

11 Claims, 2 Drawing Sheets

TROWEL

BACKGROUND OF THE INVENTION

The invention relates to a finishing tool for viscous material known in the trade as a trowel. In the invention, the elements of the structure permit the trowel to be manufactured from materials that are different from those used heretofore in the art and which have properties that facilitate manufacture and use as a tool.

Trowels used in hand spreading and smoothing of viscous materials such as adhesives, plaster, and concrete are well known in the art, and are generally made of a flat blade member with a handle, the blade being modified in some cases for particular applications. Such trowels have typically been made of metal, which has many beneficial properties, but also has the disadvantages of complex manufacturing operations and susceptibility to corrosion.

One type of trowel in the art used for the measured spreading of viscous materials, such as an adhesive has a blade that has at least one notched or serrated edge with notch spacings that serve to measure the quantity being applied. One illustration of a serrated blade trowel is shown in U.S. Pat. No. 4,724,572. Another type of trowel in the art used for the finishing of plaster or concrete has a blade which in one portion is provided with a bend that facilitates edging of the material being finished. An illustration of a trowel with a finishing bend is shown in U.S. Pat. No. 4,737,097. The attachment and positioning of the handle of a trowel is of some importance. It is positioned relatively centrally of the blade with space for the hand, yet it must be fastened to the blade with sufficient retentive strength so as to withstand any mechanical advantage of forces applied at the edge of the blade in the course of the finishing or spreading operation. The handle, further, must be retained on the blade in such a manner that the side of the blade that is used in finishing does not mar the smoothness to be achieved—which could occur if the retention means for the handle extended through the blade.

In the 4,724,572 patent, the blade is provided with an opening and the handle fits flush in the opening, being retained by tangs. This requires a special cooperative structure between handle and blade with material and shaping limitations.

In the 4,737,097 patent, the handle is fastened to a flat plate that is in turn bonded to one side of the blade.

Heretofore in the art, the criteria for the tool have commonly been met using metal as a material. However, as the art progresses it is becoming advantageous to use materials other than metals. For example, plastic material can be judiciously utilized enable achievement of a light weight tool, greater ease in manufacturing and shaping, as well as providing corrosion resistance, in comparison with metals.

U.S. Patent No. 4,316,302 discloses a one-piece plastic trowel. The handle of this trowel includes integrally molded portions overlapping the top of the blade. The junction of the handle with the blade is a region of extremely high stress, and a region where high strength is necessary. As is well known, it is difficult to produce a molded plastic article having large concentrated masses of material without post-molding shrinkage. Accordingly, the strength of the junction of the blade and handle in an integrally molded tool is limited by the amount of material which can be placed at this critical location.

OBJECTS AND SUMMARY OF THE INVENTION

It is an object of the invention to provide a trowel which overcomes the drawbacks of the prior art.

It is a further object of the invention to provide a trowel adapted for manufacture from a plastic resin.

Briefly stated, a plastic trowel achieves strength through use of a blade with a smooth lower side and with handle-retaining members integral with an upper side, and with strengthening ribs on the upper side. The blade is assembled with a ribbed handle having openings in the end portions for broad area flat contact with the blade by engaging bosses defining the handle-retaining members. The bosses are upset after the handle is installed to fasten the handle to the blade.

A trowel is provided wherein the combined elements impart desirable structural features for the tool in compatibility with the use of light weight, moldable, corrosion resistant materials such as plastics. The trowel of the invention incorporates as a primary feature handle-retaining members and reinforcing ribs integral with the blade member; such feature further including a handle that engages the retaining members by means of openings formed in flat, blade-contacting end portions, thereby to achieve the ultimate retention objective.

According to an embodiment of the invention, there is provided a plastic trowel comprising: a substantially flat blade, a smooth lower side on the blade, an upper side on the blade, a curved handle, at least a first handle-retaining means on the upper side near a first end of the blade, at least a second handle-retaining means from the upper side near a second end of the blade, an arcuate handle, a first end portion extending from a first end of the handle, a second end portion extending from a second end of the handle, first engagement means on the first end portion for engaging the first handle-retaining means, second engagement means on the second end portion for engaging the second handle-retaining means, the first handle-retaining means including a first member passing through the first end portion, a first upset on the first member above the first end portion, whereby the first end portion is firmly affixed to the blade, the second handle-retaining means including a second member passing through the second end portion, and a second upset on the first member above the second end portion, whereby the second end portion is affixed to the blade.

According to a feature of the invention, there is provided a plastic trowel wherein: the at least a first handle-retaining means includes first and second studs integrally formed with the blade, the first engagement means includes first and second holes in the first end portion, the first and second studs passing through and beyond the first and second holes, the at first upset being an upset on each of the first and second studs, the at least a second handle-retaining means includes third and fourth studs integrally formed with the blade, the second engagement means includes third and fourth holes in the second end portion, the third and fourth studs passing through and beyond the third and fourth holes, and the at second upset being an upset on each of the first and second studs.

According to a further feature of the invention, there is provided a plastic trowel comprising: a flat blade having a smooth lower side and an upper side having integral handle-retaining members proximate each end and integral ribs parallel to the longitudinal edges of the blade, and a ribbed handle having a center portion and flat blade contacting end portions, each end having a pair of openings for surrounding integral bosses defining the means for securing the handle-retaining members in the openings.

According to a still further feature of the invention, there is provided a plastic trowel comprising: a flat plastic blade, the blade having a length dimension and a width dimension, the blade further having first and second parallel sides, the first side having a smooth surface, the second side having first and second spaced integral pairs of bosses defining handle-retaining members proximate respective end edges of the blade, the second side further having a plurality of at least four ribs integral with the blade, one pair of the ribs being located with one rib along each longitudinal edge of the blade, the other pair of ribs being located parallel to the first pair with each rib positioned proximate but separated from the bosses, and a plastic handle having a width less than the separation between the second pair of ribs, the handle having an arched center portion and flat blade-contacting ends, each end having openings for engaging a pair of the bosses, the handle having ribs extending along the center portion, the handle being positioned on the blade with the bosses extending through the openings.

The above, and other objects, features and advantages of the present invention will become apparent from the following description read in conjunction with the accompanying drawings, in which like reference numerals designate the same elements.

DETAILED DESCRIPTION OF THE INVENTION

Figure 1:
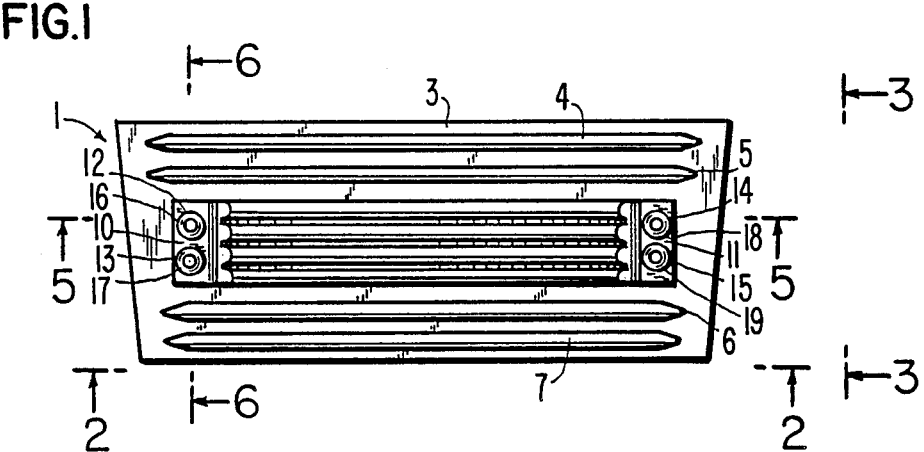
FIG. 1 is a plan view of a preferred embodiment of the invention.

Referring now to the figures of the drawing, in FIG. 1 a plan view of the trowel of the invention is provided. As seen, the blade 1 has a smooth lower side 2, shown in detail in FIG. 4, and an upper side 3 from which ribs 4, 5, 6, 7, are upstanding, being suitably positioned for strengthening purposes. The blade 1 may be any shape functional for the application, rectangular or trapezoidal being employed for most applications. The edges of blade 1 may be notched or given a radius bend, neither shown, for particular application purposes.

Figure 2:
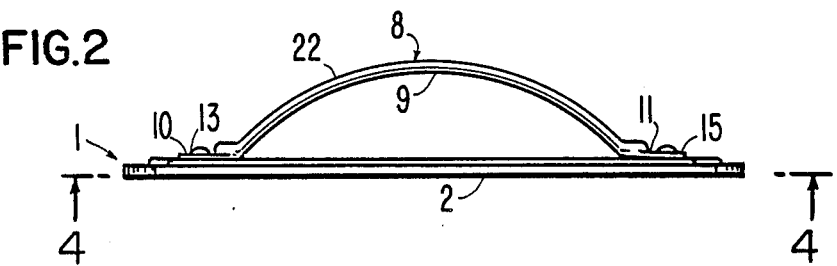
FIG. 2 is a side view of the invention in the direction 2—2 seen in FIG. 1.
Figure 4:
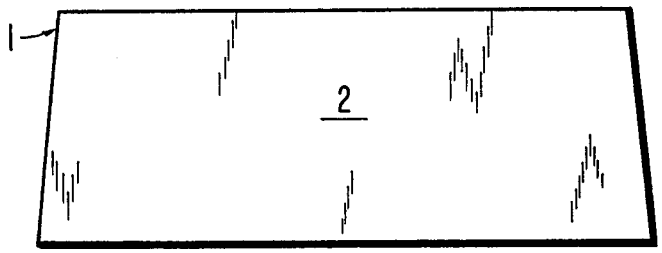
FIG. 4 is a lower side plan view in the direction 4—4 seen in FIG. 2.
Figure 5:
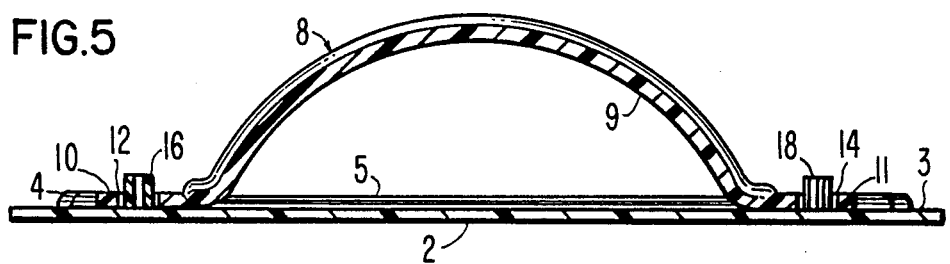
FIG. 5 is a longitudinal sectional view taken on the line 5—5 in FIG. 1.

From the illustrations of FIGS. 2 and 4, the relative thickness of the blade 1 and the unbroken smoothness of the underside 2 can be appreciated. As a consequence of these attributes, the invention provides a very light weight, quality tool that yields a high degree of smoothness in the finished work.

Returning to FIG. 1, the ribs 4 and 7 are positioned proximate to the side edges of the trowel, and the tapered end portions thereof are positioned proximate to the end edges, thereby to provide strength to the relatively thin blade as needed to cope with the stress encountered in the particular use.

As seen in FIGS. 1, 2, 3, 5, and 8, the trowel is provided with a handle 8, which has a curved, hand-accommodating, portion 9. At end portions 10 and 11 the shape of the handle is flat where contact is made with the upper side 3 of the blade 1. There are pairs of openings 12, 13 and 14, 15 in the end portions 10 and 11 respectively, through which pass handle-retaining members 16, 17 and 18, 19 respectively that are integral with the blade 1. The retaining members 16, 17, 18, and 19 have their portions that extend upwardly through the openings 12, 13, 14, and 15 suitably upset, as will be explained.

The handle 8 is of such length that the end portions 10 and 11 are proximate to the end edges of the blade; and the width of the handle is such that together with the ribs 5 and 6 lateral strength is imparted to the assembly. The handle 8 is provided with ribs 20, 21, 22, and 23 for added strength and rigidity.

Figure 3:
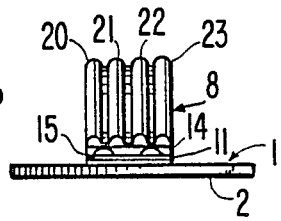
FIG. 3 is an end view of the handle of the invention in the direction 3—3 seen in FIG. 1

FIGS. 1, 2, 3, 5, and 6 particularly illustrate the broad flat end portions 10 and 11 of the handle 8 by means of which there is imparted both lateral and longitudinal strength to the trowel. In FIG. 3, the rigidity and strength imparted by the ribbed structure 20, 21, 22, and 23 of the handle extending over the length and ending proximate to the handle-retaining members 14 and 15 on the end portion 11 of the handle 8 will be apparent.

It will thus be appreciated that, in accordance with the invention, the structural elements in combination impart interdependent strength and rigidity in all directions to the trowel assembly.

Figure 6:
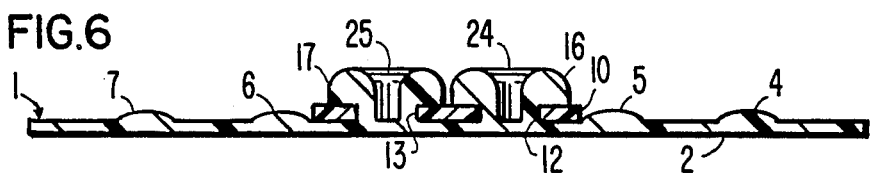
FIG. 6 is a transverse sectional view, taken on the line 6—6, illustrating the upsetting of the bosses defining the retaining members.
Figure 7:
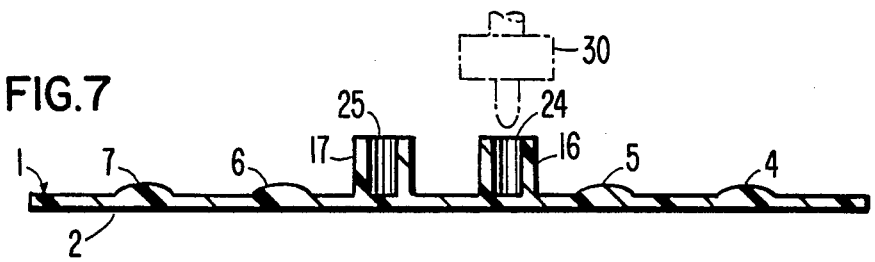
FIG. 7 is a view in cross section of the blade, illustrating the integral ribs, and the bosses defining, the integral retaining members.

Referring next to FIGS. 1, and 5–9, the retention construction and assembly will be described. The cross sectional views of FIGS. 6 and 7 show the ribs 4, 5, 6, and 7 and the bosses which define handle-retaining members 16 and 17. It will be understood that the openings 12, 13, 14, and 15 in handle 8 enable fitting of the handle with respect to the bosses defining both spaced pairs of retaining members 16, 17, 18, and 19 so that the handle end portions 10 and 11 are in broad area contact with the blade 1.

FIG. 6 depicts a later stage in the assembly, i.e., after the bosses 16 and 17, as originally molded (FIG. 7), have been upset to produce the final doughnut-like configurations seen in FIG. 6. This step results in firm fastening of the handle 8 to the blade 1. The center bores 24 and 25 respectively facilitate the upsetting of the bosses using a typical ultrasonic welding horn or heat staking tool 30 shown dotted in FIG. 7. As noted previously, the ribs and retaining members are integral with the blade 1 and may be molded as part of and in the same operation as the formation of the blade 1.

Although the foregoing shows and describes an embodiment of the invention using a single row of two bosses 16 and 17 at each end of the handle 8, this should not be taken as limiting. More or fewer bosses may be employed at each end of the handle 8 without departing from the spirit and scope of the invention. For example, each end of the handle may have two or more rows of bosses. In one embodiment of the invention (not shown), two rows of four bosses are employed at each end of the handle 8.

Figure 8:
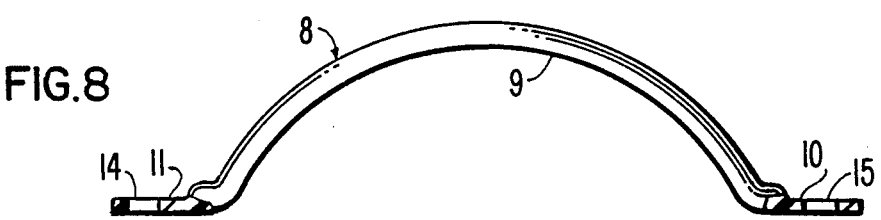
FIGS. 8 and 9 are dimensionally correlated assembly views of the handle in FIG. 8 and the blade in FIG. 9.
Figure 9:

In FIGS. 8 and 9, the ease of assembly is illustrated, and while the handle 8 is preferably assembled and the retaining members confined or upset in a single manufacturing setting, where the situation is desirable, such as for shipping advantage, the handle 8 may be positioned apart from the blade 1, as shown in FIGS. 8 and 9 for completion of the assembly later.

In the preferred embodiment, faces of end portions abutting 10 and 11 abutting upper side 3 are secured or bonded thereto by any convenient means such as, for example, cementing or ultrasonic welding, either during assembly (for cementing) or after assembly (for ultrasonic welding). When cementing or welding is used, it may be sufficient to omit one of the handle-retaining members from each end, and to relocate the remaining one at each end more central to the blade 1.

There are many types of plastic materials available in the art, each with properties useful in certain applications. For typical viscous material processing operations a preferred one is of the type of polystyrene known in the trade as high impact.

What has been described is a trowel wherein strength sufficient for use of plastic materials is achieved through interdependent combined structural features, whereby a light weight quality trowel is realized.

In addition to the features shown and described, additional rigidity may be attained by providing a shaped depression (not shown) in the upper side 3 into which end portions 10 and 11 may be fitted closely. The possibility of mechanical between end portions 10 and 11 and the edges of their respective shaped depressions may add a substantial additional rigidity to the assembled tool.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

We claim:

1. A plastic trowel comprising:
   a substantially flat blade;
   a smooth lower side on said blade;
   an upper side on said blade;
   a curved handle;
   a first handle-retaining means on said upper side near a first end of said blade;
   a second handle-retaining means on said upper side near a second end of said blade;
   an arcuate handle;
   a first end portion extending from a first end of said handle;
   a second end portion extending from a second end of said handle;
   first engagement means on said first end portion for engaging said first handle-retaining means;
   second engagement means on said second end portion for engaging said second handle-retaining means;
   said first handle-retaining means including a first member passing through said first end portion;
   a first upset on said first member above said first end portion, whereby said first end portion is firmly affixed to said blade;
   said second handle-retaining means including a second member passing through said second end portion; and
   a second upset on said second member above said second end portion, whereby said second end portion is affixed to said blade.

2. A plastic trowel according to claim 1, wherein said first and second members each includes a tubular member extending at right angles to said upper side.

3. A plastic trowel according to claim 1, wherein said blade includes longitudinal ribs parallel to longitudinal edges of said blade.

4. A plastic trowel according to claim 1, wherein said handle includes a plurality of ribs upon a surface thereof.

5. A plastic trowel according to claim 1 wherein:
   said first handle-retaining means includes first and second studs integrally formed with said blade;
   said first engagement means includes first and second holes in said first end portion;
   said first upset being an upset on each of said first and second studs; and
   said second handle-retaining means includes third and fourth studs integrally formed with said blade;
   said second engagement means includes third and fourth holes in said second end portion;
   said third and fourth studs passing through and beyond said third and fourth holes, and
   said second upset being an upset on each of said third and fourth studs.

6. The trowel of claim 1 wherein said blade is trapezoidal.

7. The trowel of claim 1 wherein said blade is rectangular.

8. The trowel of claim 1 wherein said plastic is polystyrene.

9. A plastic trowel comprising:
   a flat blade having longitudinal edges, opposite ends, a smooth lower side, an upper side having integral handle-retaining members proximate each said end, and integral ribs parallel to the longitudinal edges of the blade;
   a ribbed handle having a center portion and flat blade-contacting end portions, each end portion having a pair of openings; and
   means for securing said handle-retaining members in said openings, said handle-retaining members comprising bosses integral with said blade, said openings surrounding said bosses.

10. The trowel of claim 9 wherein said plastic is polystyrene.

11. A plastic trowel according to claim 1, wherein said first engagement means comprises a first generally planar surface facing said upper side of said blade;
    said second engagement means comprises a second generally planar surface facing said upper side of said blade; and
    said upper side of said blade includes a generally planar surface abutting said first generally planar surface of said first engagement means and said second generally planar surface of said second engagement means,
    said plastic trowel further comprising means for bonding said generally planar surface of said upper side of said blade to said first generally planar surface and said second generally planar surface.

* * * * *